(12) United States Patent
Kikin-Gil et al.

(10) Patent No.: US 8,825,679 B2
(45) Date of Patent: Sep. 2, 2014

(54) AGGREGATED VIEW OF CONTENT WITH PRESENTATION ACCORDING TO CONTENT TYPE

(75) Inventors: Ruth Kikin-Gil, Redmond, WA (US); Anne Archambault, Redmond, WA (US); Cedric P. Dussud, Seattle, WA (US); Hai Liu, Sammamish, WA (US); Nelle Steele, Redmond, WA (US); John Griffin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 134 days.

(21) Appl. No.: 13/027,273

(22) Filed: Feb. 15, 2011

(65) Prior Publication Data

US 2012/0209850 A1    Aug. 16, 2012

(51) Int. Cl.
*G06F 17/30*        (2006.01)

(52) U.S. Cl.
USPC ........................................ 707/755; 707/802

(58) Field of Classification Search
USPC ................................................ 707/755, 802
See application file for complete search history.

(56) References Cited

U.S. PATENT DOCUMENTS

| | | |
|---|---|---|
| 2006/0277460 A1 | 12/2006 | Forstall et al. |
| 2008/0034314 A1 | 2/2008 | Louch et al. |
| 2008/0077462 A1* | 3/2008 | Patel et al. ........................ 705/7 |
| 2008/0215420 A1* | 9/2008 | Angelica ........................ 705/11 |
| 2009/0070346 A1* | 3/2009 | Savona et al. ................. 707/100 |
| 2009/0070426 A1* | 3/2009 | McCauley et al. ............ 709/205 |
| 2009/0249229 A1 | 10/2009 | Offer |
| 2010/0312769 A1* | 12/2010 | Bailey et al. .................. 707/740 |
| 2011/0029636 A1* | 2/2011 | Smyth et al. .................. 709/217 |
| 2011/0196935 A1* | 8/2011 | Rideout et al. ................ 709/206 |
| 2011/0246457 A1* | 10/2011 | Dong et al. .................... 707/725 |

OTHER PUBLICATIONS

Williams, Alex, "Microsoft Testing OfficeTalk—Microblogging Service Much Like Twitter", Retrieved at << http://www.readwriteweb.com/enterprise/2010/03/microsoft-developing-officetal.php >>, Mar. 24, 2010.

"Share real-time updates with people in your network", Retrieved at << http://www.socialcast.com/features/enterprise_microblogging.html >>, Retrieved Date: Oct. 8, 2010.

Gray, Michael, "5 Microblogging Sites that aren't Twitter", Retrieved at << http://searchengineland.com/5-microblogging-sites-that-arent-twitter-23481 >>, Aug. 11, 2009.

"Zune", Retrieved at << http://www.zune.net/en-US/promotions/jointhesocial/defaulthtm >>, Retrieved Date: Oct. 8, 2010.

\* cited by examiner

*Primary Examiner* — Son T Hoang
(74) *Attorney, Agent, or Firm* — Rachael Vaughn; Leonard Smith; Micky Minhas

(57) ABSTRACT

Architecture that facilitates the discovery of interesting and relevant content by a user in a serendipitous way on a microblogging site. For example, relevant content can be defined as connected to the user, the user's work, and user interests, while interesting content can be defined as content that does not directly affect the user, yet the user chooses to obtain (e.g., for viewing, interacting, etc.). The content can be presented as a tile cluster, where each tile is a specific content type (e.g., image, link, post, user recommendations, tags, etc.). Additionally, the content can be obtained and presented relative to a specific temporal setting such as the latest content. The different content types are visually distinguished such that one type of content looks and behaves differently from another content type. The user can also drill into content details from the top content.

18 Claims, 11 Drawing Sheets

AGGREGATED VIEW OF CONTENT WITH PRESENTATION ACCORDING TO CONTENT TYPE

BACKGROUND

Microblogging is quickly becoming a useful resource for communications between users. Microblogging differs from blogging in that content is typically smaller than the content utilized in blogging. Thus, users are not tasked with the time to read messages that would otherwise be expended to read the larger blog type messages of hundreds of words. For example, a microblog message may consist of nothing more than a sentence fragment, or an image, for example, in contrast to blog messages that typically contain more content. Moreover, the microblog message content is smaller in size and overall file size is typically much smaller than blog messages.

As employed in a corporate environment, for example, it is difficult for users to find information in a microblog feed that relates to topics of interest such as projects. Moreover, existing microblog infrastructures are limited such as when a user finds a topic of interest, it is then further difficult to receive updates about the latest posts and discussions related to the topic. Thus, in order to track the content about the topics of interest the user has to seek out sources related to the topics.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates the discovery of interesting and relevant content by a user in a serendipitous way on a microblogging site. For example, relevant content can be defined as connected to the user, the user's work, and user interests, while interesting content can be defined as content that does not directly affect the user, yet the user chooses to obtain (e.g., for viewing, interacting, etc.).

The content can be presented as a tile cluster, where each tile is a specific content type (e.g., image, link, post, user recommendations, tags, etc.). Additionally, the content can be obtained and presented relative to a specific temporal setting such as the latest (most recent), in the last x days, and so on. There can be multiple tile clusters that present content based on different criteria (e.g., the most recent).

The content can be searched, obtained, and presented as top content, where the top content is defined by the number of replies, likes tags, and clicks on an item. Moreover, the top content can be perceived (e.g., presented in a visual and glanceable manner, presented using an identifiable audio technique, etc.). The different content types are visually distinguished such that one type of content looks and behaves differently from another content type. The user can also drill into full content from the top content.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
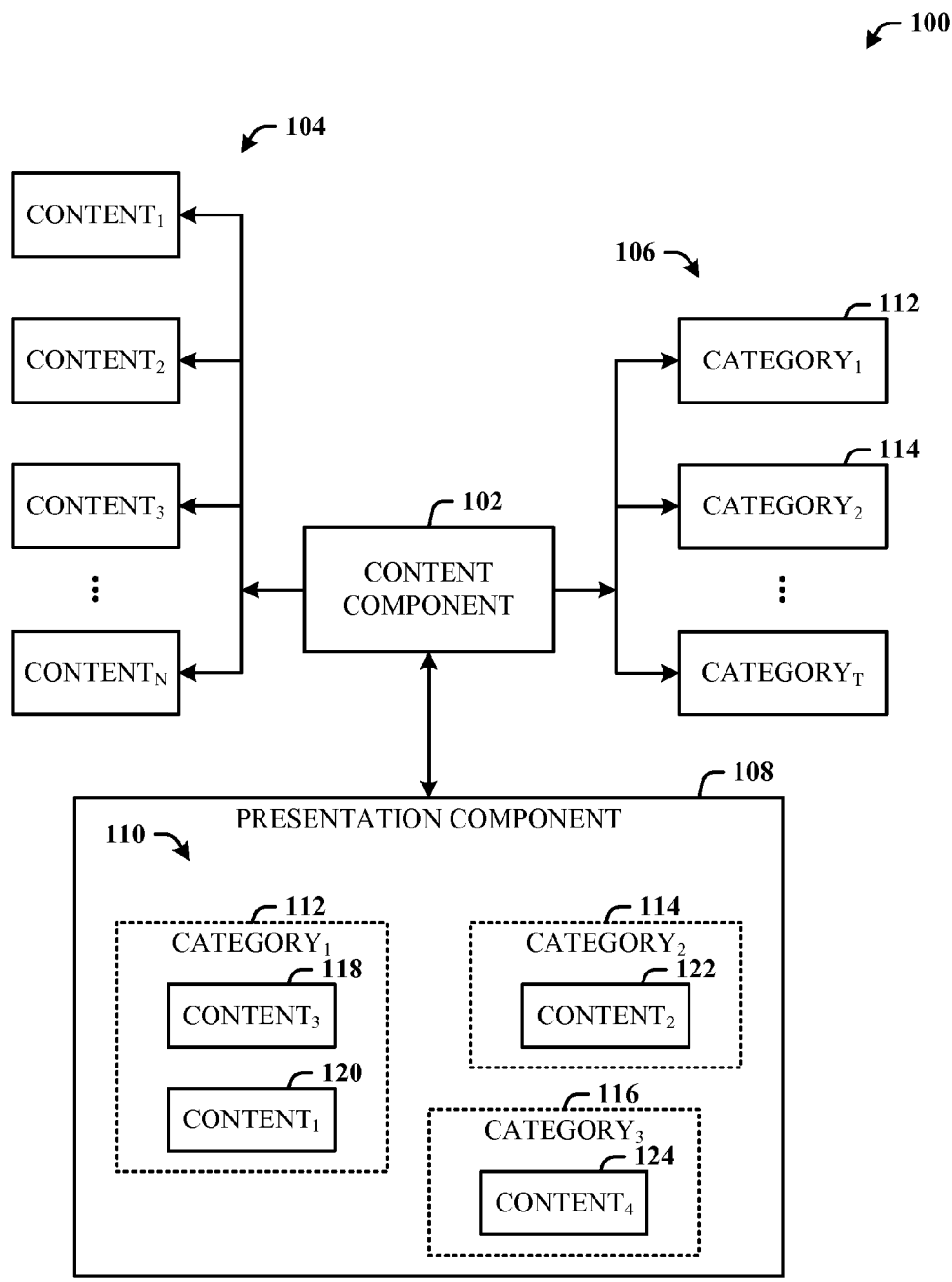
FIG. 1 illustrates a computer-implemented content system in accordance with the disclosed architecture.

The disclosed architecture finds application to microblogging platforms in enterprise and/or public infrastructures. Rather than obtaining and presenting content related to an anchor item (or object), the architecture allows the obtainment and presentation of disparate content types that can be related or unrelated. Visual differentiation is provided between the various types of content presented and each content type looks and behaves differently. The presentation aggregates the content types in a single window (or screen) for viewing, realtime updating, and for further interaction (e.g., for detailed information). Moreover, the content can be processed such that only the "top" content of given content categories (types) is selected and presented, where the top content can be determined by a ranking process, the content information itself, policies, and/or other criteria.

The content, obtained from a microblog communications feed, can be presented and accessed via a single window (e.g., referred to as a highlights page). The window presents an aggregated view of the content types as a cluster of content tiles. Thus, a user can view the tile cluster and get a general idea of the topic(s) of interest conveyed over a desired timeframe. The content can be selected based on time characteristics (e.g., specific time, a time span, etc.). For example, a user returning from a 5-day vacation can view the highlights page for top content that has occurred over the last seven days to obtain a quick understanding of one or more topics that have been communicated while on vacation. Rather than the user having to seek out the various forms of communications, such as email, messaging, documents, etc., the architecture provides a quick glanceable view of the latest topics of interest across various disparate content types and users.

The user is presented with relevant content (connected to the user, the user work life, the user interests, etc.), and interesting content (does not affect the user directly, but the user enjoys consuming). Examples of relevant content include, but are not limited to, construction in the user parking garage, related research/project from an R&D group, an upcoming photography show, new announcements from a key competitor, a special menu of the cafeteria, commendations to a teammate, system outages, traffic conditions nearby, updated specifications that the user needs to read, Q&A to assist in problem solving, best practices in the user field, feedback sought on certain topics, and a new re-organization for a partner team.

Examples of interesting content can include, but are not limited to, an article on technology web blog, a previous manager getting married, an old colleague switching jobs, a tip on resolving a common program issue, a nearby celebrity sighting, a question of the day, a caption for a photo, an upcoming bike-to-work day, and a quote of the day.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented content system 100 in accordance with the disclosed architecture. The system 100 includes a content component 102 that categorizes content 104 of different types received, from a microblog web service, for example, into corresponding categories 106, and selects top content for each category. A presentation component 108 presents each category (of the categories 106) of top content as correspondingly different visual representations 110 based on content type and associated behavior.

In one implementation, the manner of presentation of the representations 110 is similar for all users. In an alternative embodiment, the manner of presentation of the representations 110 can be personalized for each user.

In this example, the presentation component 108 presents three categories of content in a cluster of content tiles: a first category 112, a second category 114, and a third category 116. The first category 112 of content type includes a first content 118 and a second content 120, the second category 114 includes a third content 122, and the third content category 116 includes a fourth content 124. Thus, a category can include one or more items of the same content type.

As indicated above, the content presented can be the top content for a given category. The top content can be the single top-most content item and/or a top set of content items for the associated category. The content (or top content) can include a post that is selected based on likes and activity related to the post, a link that is selected based on likes and activity related to an original post that included the link and/or actual clicks on the link, an image (or video) that is selected based on likes and activity related to an original post that included the image (video), recommended users to follow and highlighted users to follow, and popular tags (e.g., hash tags).

The behavior of a given content type enables drill-down to additional details of the selected content type. This is described in detail herein below. The content can be obtained from a communications feed (e.g., personal and/or company microblog) and presented as a cluster of content tiles in which a user has an interest.

Figure 2:
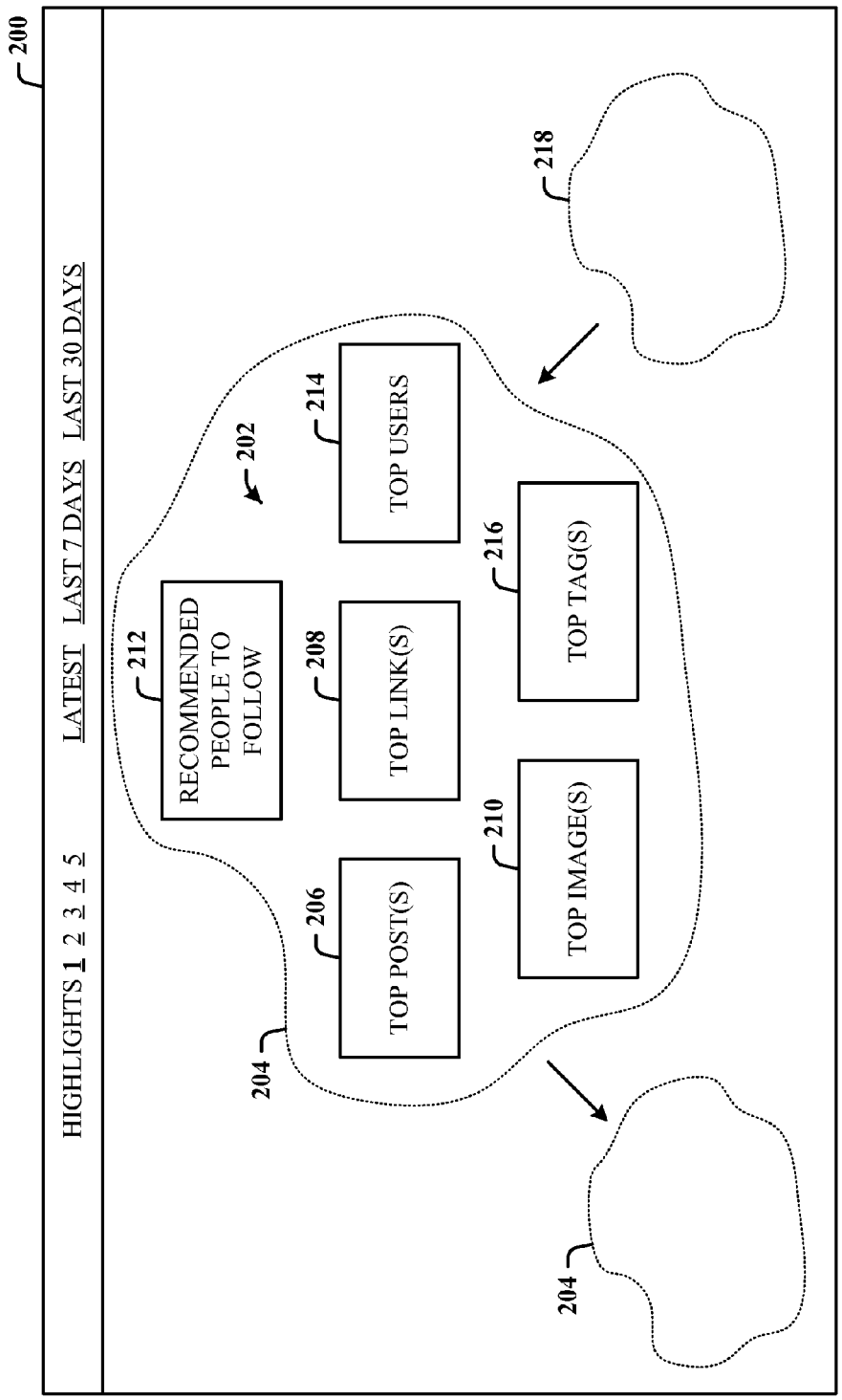
FIG. 2 illustrates an exemplary window via which microblog content is aggregated and presented.

FIG. 2 illustrates an exemplary window 200 via which microblog content 202 is aggregated and presented. The window 200 (also referred to as a highlights page) is an aggregated view of content, with presentation varying according to the content type that is emphasized. The view of the content 202 can be as a cluster 204. The window 200 (or highlights area) is a way for users to consume, at a glance, top content from the microblogging service.

In one implementation, the manner of presentation of the content 202, clusters 204, and/or window 200 itself, can be configured to be similar for all users. In an alternative embodiment, the manner of presentation of the content 202, clusters 204, and/or window 200 itself, can be configured to be personalized for on a user basis.

In one implementation, six types of content 202 are utilized; however, this is not to be construed as limiting in that a smaller number or greater number of content types can be employed. Here, the top content of content categories is obtained and presented. The top content can include top posts 206 (e.g., determined by combination of the number of likes and number of replies on a given post). For content such as messages, the "likes" designator can be weighted to count multiples (e.g., five times) as much as replies, since "likes" tend to occur less frequently.

The top content can further include top links 208 (e.g., determined by the combination of the number of likes and number of replies on the original post that contained the link), actual number of clicks on the link aggregated across all instances of that link in the system, etc., and top images 210 (e.g., determined by the combination of the number of likes and the number of replies on the original post that contained the image). The top content can also in the "recommended people to follow" 212, which is defined according to the number of followers (most popular), the activity level (most active), and the number of likes on the associated posts (most liked), for example. This is not to be construed as limiting, in that people to follow can also include other reasons to follow such as "this person is on your team", "you are both interested in FOO", etc.

Top users 214 can followed as defined according to the number of followers (most popular), the activity level (most active), and the number of likes on the associated posts (most liked). The top content can also include a set of the most popular tags 216 (e.g., hash tags).

In order to further determine top content, other mechanisms or criteria can be employed, such as the click-through activity, viewing duration, user profile information, etc. In one implementation, the architecture works the same for all users. In an alternative implementation, each user is allowed to personalize the configuration such that only topics of interest to the user within the user network are surfaced in the cluster, rather than topics at large (e.g., for the enterprise, automatically for the user, etc.).

Each content type has a specific design that communicates its specific characteristic, and calls for action accordingly. For example, the "top link" content tile 208 allows the user to open the link straight from the highest-level view, and a "recommended person to follow" tile 212 enables the user to follow that person immediately.

The content information can be presented according to multiple different time periods such as "latest" (the current time within twenty-four hours), "last 7 days", "last 30 days" and "all times". Users can browse multiple (e.g., five) content sets for each time period.

Once the user selects a content tile, an associated detailed view page is opened. Each content type can have a different detailed page design tailored to its content (which in some cases can differ from the content as found on a website).

In one implementation, the aggregated view categorizes the content, selects the best (or top content item) of each category, then shows the results in the single window 200. Each content category is presented in a differentiating way for quick visual identification. Additionally, this facilitates easy access to the body of content in the main feed. In this way, a user can quickly perceive and understand what happened in a specific timeframe, without having to search for the information from the feed, and without having to look for the information in various different sources.

It is to be understood that additional clusters can be presented on a single page. In other words, in addition to the cluster 204, another cluster 218 can be presented in a reduced mode in the lower right corner, for example, and selection on one of the tiles in the other cluster 218 automatically brings the other cluster into 218 expanded view and reduces the cluster 204 into the left corner area of the window 200. The same process can then be initiated to bring the cluster 214 back into expanded view while reducing cluster 218 back into the reduced mode of the lower right corner.

The window 200 shows that presentation is currently a first page (as indicated by the bolded number "1" at the top). By selecting a second page (the number "2" at the top), a second layer of content tiles can be presented (that is, a second set of top content not presented as part of the cluster 204 on page one).

Figure 3:
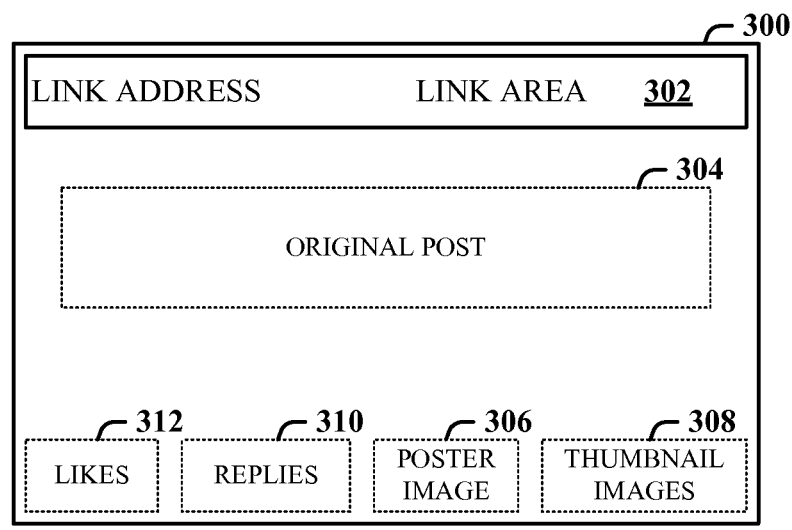
FIG. 3 illustrates an example top link content tile.

FIG. 3 illustrates an example top link content tile 300. The information in the top link tile 300 can include a shortened link in a link area 302, the original post 304 of which the link was a part, an image 306 of the poster, thumbnail images 308 of people who were involved in the conversation associated with the link, a numerical indication 310 for how many people replied to the post, and a numerical indication 312 for how many people liked the post. The thumbnail images 308 are of people who participate in the conversation associated with the item, have "liked" the item, and/or have clicked on the link, for example. A user can interact (e.g., click) on the link (Link Address) in the link area 302 and launch an associated website in a separate window. The user can also select (e.g., click on using a pointing device) a Like button to designate that the user "likes" the post 304. Additionally, the user can select (e.g., click) anywhere in the tile 300 to launch an associated details page.

Figure 4:
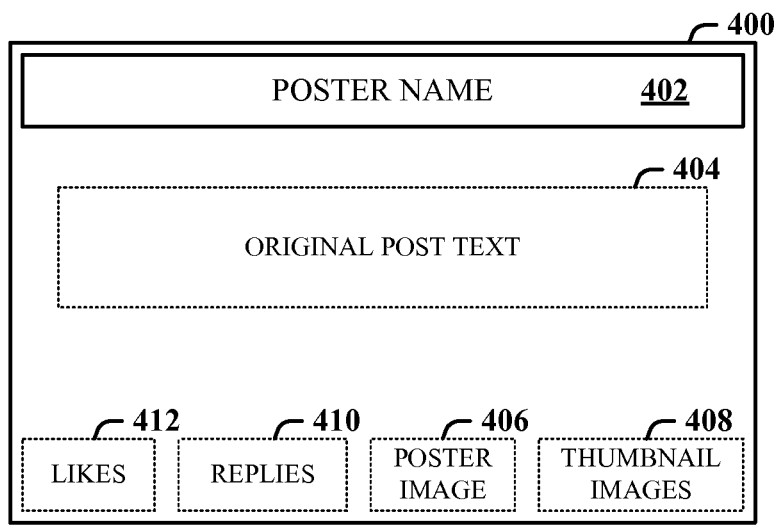
FIG. 4 illustrates an example post content tile.

FIG. 4 illustrates an example post content tile 400. The information in the top post tile 400 can include the poster's name 402, original post text 404, an image of the poster 406, thumbnail images 408 of people who were involved in the conversation around the post, a numerical indication 410 for how many people replied to the post, and a numerical indication 412 of how many people liked the post. As before, the thumbnail images 408 are of people who participate in the conversation associated with the item, have "liked" the item, and/or have clicked on the link, for example. A user can select a Like button to designate that the user "likes" the post 404. Additionally, the user can select (e.g., click) anywhere in the tile 400 to launch an associated details page.

Figure 5:
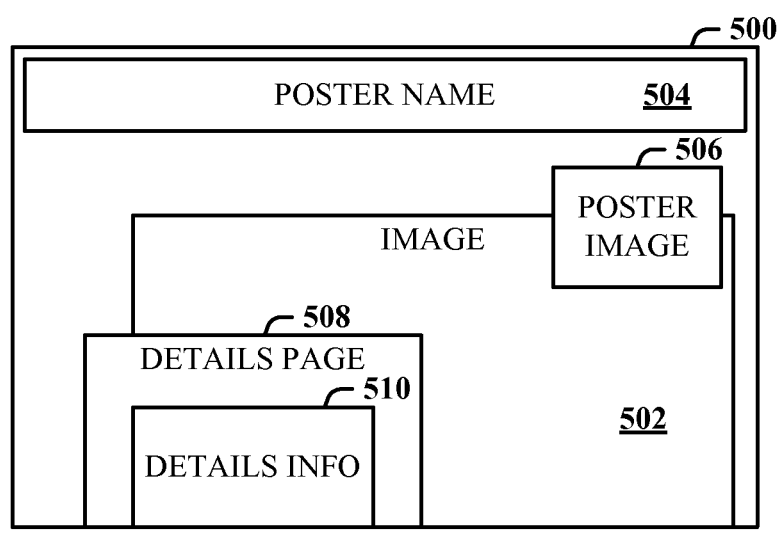
FIG. 5 illustrates an example image content tile.

FIG. 5 illustrates an example image content tile 500. Thus, the tile 500 includes an image 502. The information presented in the image tile 500 can include the poster's name 504 an image 506 of the poster. Additionally, the user can select (e.g., click) anywhere in the tile 500 to launch an associated details page 508, which surfaces details information 510.

Figure 6:
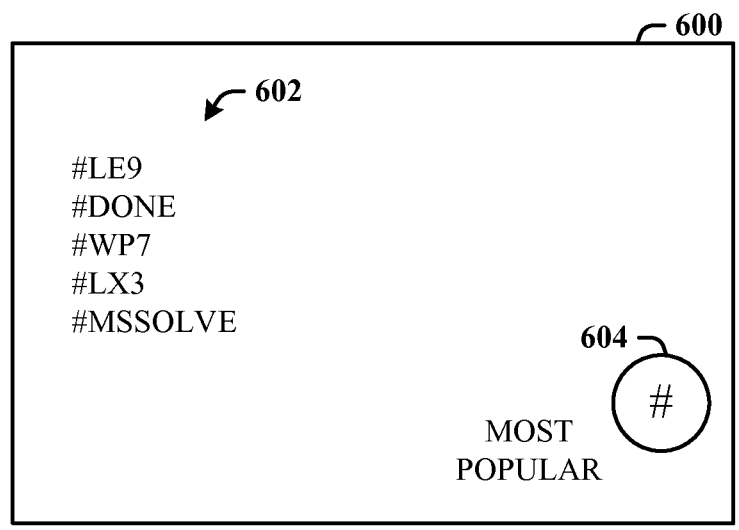
FIG. 6 illustrates an example tags content tile.

FIG. 6 illustrates an example tags content tile 600. Information presented in the tags tile 600 can include a list of tags 602, which delineate most used tags and/or liked tags, and an indication 604 that these are the most popular tags. Additionally, the user can select (e.g., click) anywhere in the tile 600 to launch an associated details page.

Figure 7:
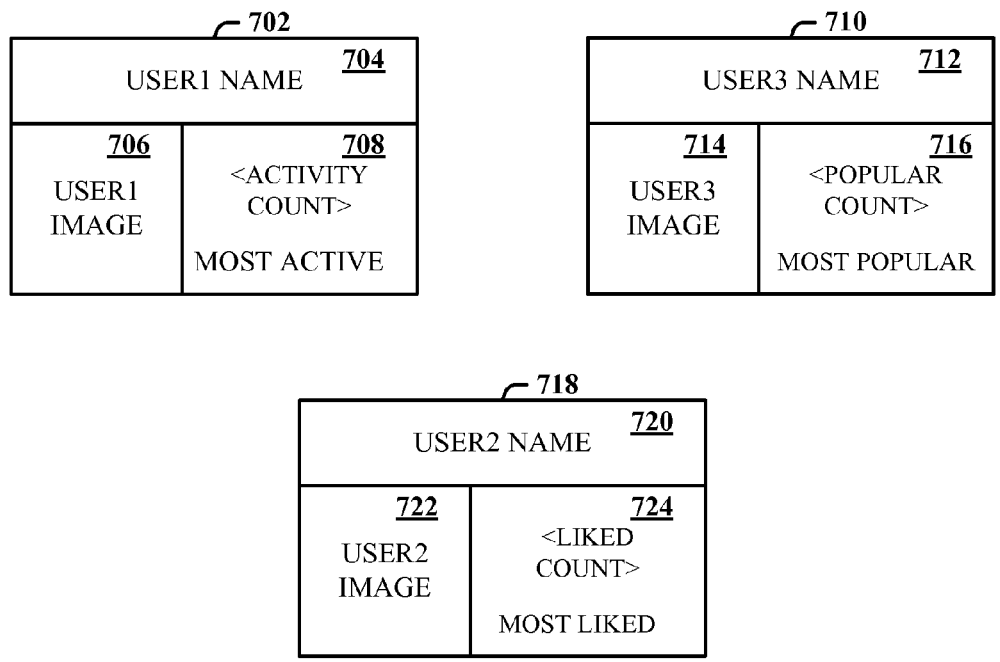
FIG. 7 illustrates an example of various people content tiles.

FIG. 7 illustrates an example of various people content tiles 700. For example, a first people tile 702 shows a user name 704, an image 706 of the user, and an activity count 708 for designation as a most active user. A second people tile 710 shows a user name 712, an image 714 of the user, and a popular count 716 for designation as a most popular user. A third people tile 718 shows a user name 720, an image 722 of the user, and a liked count 724 for designation as a most liked user. Thus, this category can be described as highlighting people—people who post the most messages (most active), people with the highest number of likes on associated posts (most liked), and people with the highest number of followers (most popular)—all within the timeframe that the user has chosen (e.g., latest, last seven days, last thirty days, etc.). Additionally, the user can select (e.g., click) anywhere in the tiles (702, 710 and 718) to launch an associated details page for the corresponding person.

Other content tiles not illustrated, but that can be employed, may include a video tile that provides content similar to the image tile 500 of FIG. 5, for example.

Figure 8:
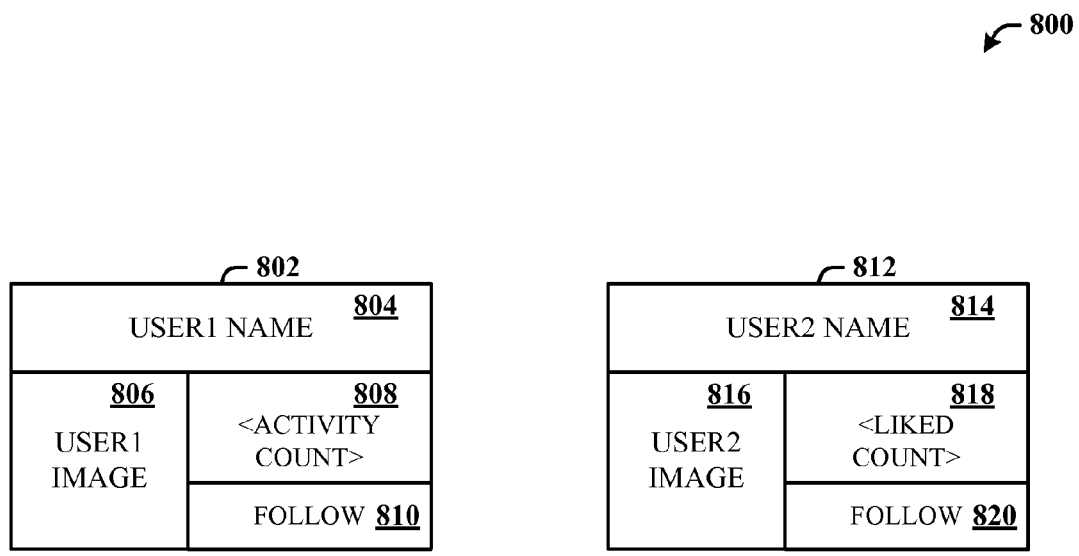
FIG. 8 illustrates example recommended-people-to-follow content tiles.

FIG. 8 illustrates example recommended-people-to-follow content tiles 800. For example, a first follow tile 802 includes a user name 804 of the person to follow, an image 806 of the user to follow, an activity count 808, and a follow designation 810. Similarly, a variation of a second follow tile 812 includes a user name 814 of the person to follow, an image 816 of the user to follow, a liked count 818, and a follow designation 820. Based on people who post the most messages (most active), people with the highest number of likes on their posts (most liked), people with the highest number of followers—all within the timeframe that the user has chosen (e.g., latest, last seven days, last thirty days, etc.). The user can click to follow directly from tile, and/or click anywhere else to see more details on the person to follow. It is within contemplation of the instant architecture that the tiles 800 can alternatively or incomination therewith include other reasons to follow someone, such as "this person is on your team" or "you are both interested of FOO", etc.

As indicated in each of the above tiles, a details page can be selected and launched that exposes additional details about the particular tile content. For example, a details page for the top posts can include, but is not limited to, the poster's image, poster's name, original post, indication of the number of likes and the number of replies for the post, number of people who liked the post plus who the people that like the post (an expanded list), a Like button, the original conversation, a Post box (for replies to the content) and, back and forward arrows for navigating between all the posts in the cluster.

A details page for the top images can include, but is not limited to, the poster's image, the poster's name, the original post, an indication of the number of likes and the number of replies for the image, back and forward arrows for navigating between all the posts in the cluster, the number of people who liked the post plus who the people are (an expanded list), a Like button, the image, the original conversation, and a Post box (for replies to the content).

A details page for the top person can include, but is not limited to, the person's name, the person's image, the title and organization of the person (e.g., obtained from a directory service), a description (e.g., written by user), a Follow/Unfollow button, follower thumbnail images plus the number of followers (e.g., clicking on a follower thumbnail image can launch a follower profile page in a separate browser), following thumbnails plus the number of people this user follows (e.g., clicking on a Following thumbnail image can launch the associated profile page in a separate browser), interests (e.g., the hash tags this person uses and follows), and the three latest messages (e.g., click on the content to launch the latest messages in a separate browser).

A details page for the top tags can include, but is not limited to, all the popular tags that shown in the content tile. For each tag, the tag name, Follow/Unfollow button, the three latest messages (e.g., click on message to launch in a separate browser), the number of people who follow the tag, and the thumbnail image of people who follow the tag (e.g., click on a person to launch user page in a separate browser).

A details page for the top link can include, but is not limited to, the poster's image, poster's name, original post, a shortened URL (uniform resource locator), an indication of the number of likes and the number of replies for the link, the number of people who liked the post plus who the people are (an expanded list), a Like button, the original conversation, a Post box (for replies to message) and, back and forward arrows for navigating between all the posts in the tile cluster.

Other functionality that can be implemented includes the capability to defined clusters to include specific relevant and/or interesting content. For example, a topics@large cluster can surface content related to links, trends, announcements, pictures, etc. Another cluster can be topics@mynetwork, which surfaces user replies, user likes, new followers, conversations in progress, etc. Another cluster can be related to a team/group, and so on.

The highlights page (e.g., window 200 of FIG. 2) can also include active Show Me topics that the user can select to include in a tile cluster. The Show Me topics for a user can include, but are not limited to, best of everything, most liked posts, most commented on, most popular links, trending topics, just my discipline, people I don't follow, most liked in my network, people I don't know and I should, funniest, beautiful, time sensitive, official announcements, events, and surprise me.

Put another way, a computer-implemented content system is provided that comprises a content component that receives and categorizes content of different content types received from a microblog web service into corresponding content categories, and selects top content for each category and a presentation component that presents the categories of content as a cluster of content tiles, each category of top content presented as a correspondingly different content tile which can be activated to expose additional details of the corresponding top content type.

The top content includes at least one of a post content type that is selected based on likes and activity related to the post, a link content type that is selected based on likes and activity related to an original post that included the link, or an image content type that is selected based on likes and activity related to an original post that included the image. The content is relevant to a user and content that is interesting to the user, the content presented in a single window for viewing. The top content includes recommended users to follow and popular hash tags. The top content can be attributed as most liked, most popular, most active, and to follow.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
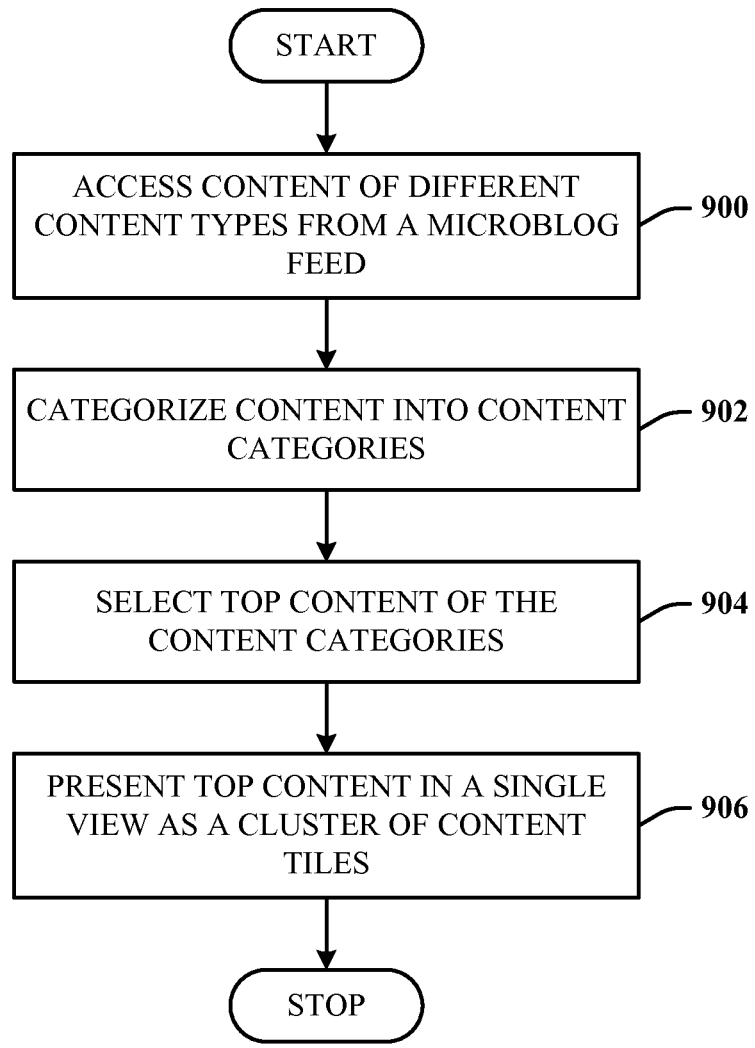
FIG. 9 illustrates a computer-implemented content method in accordance with the disclosed architecture.

FIG. 9 illustrates a computer-implemented content method in accordance with the disclosed architecture. At 900, content of different content types is accessed from a microblog feed. At 902, the content is categorized into content categories. At 904, top content of the content categories is selected. At 906, the top content is presented in a single view as a cluster of content tiles.

Figure 10:
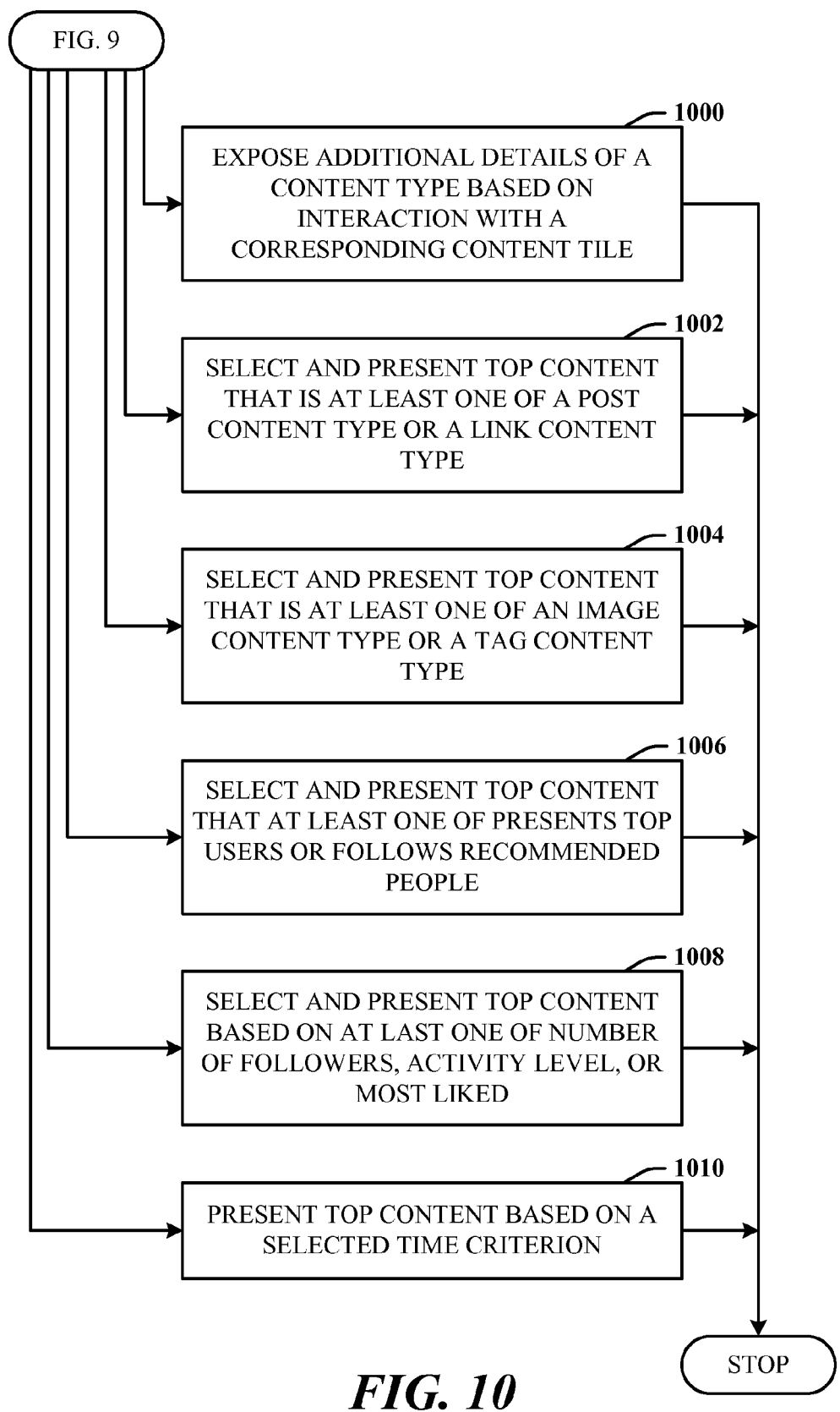
FIG. 10 illustrates further aspects of the method of FIG. 9.

FIG. 10 illustrates further aspects of the method of FIG. 9. Note that the flow indicates that each block can represent a step that can be included, separately or in combination with other blocks, as additional aspects of the method represented by the flow chart of FIG. 9. At 1000, additional details of a content type are exposed based on interaction with a corresponding content tile. At 1002, top content is selected and presented that is at least one of a post content type or a link content type. At 1004, top content is selected and presented that is at least one of an image content type or a tag content type. At 1006, top content is selected and presented that at least one of presents top users or follows recommended people. At 1008, top content is selected and presented based on at last one of number of followers, activity level, or most liked. At 1010, the top content is presented based on a selected time criterion.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 11:
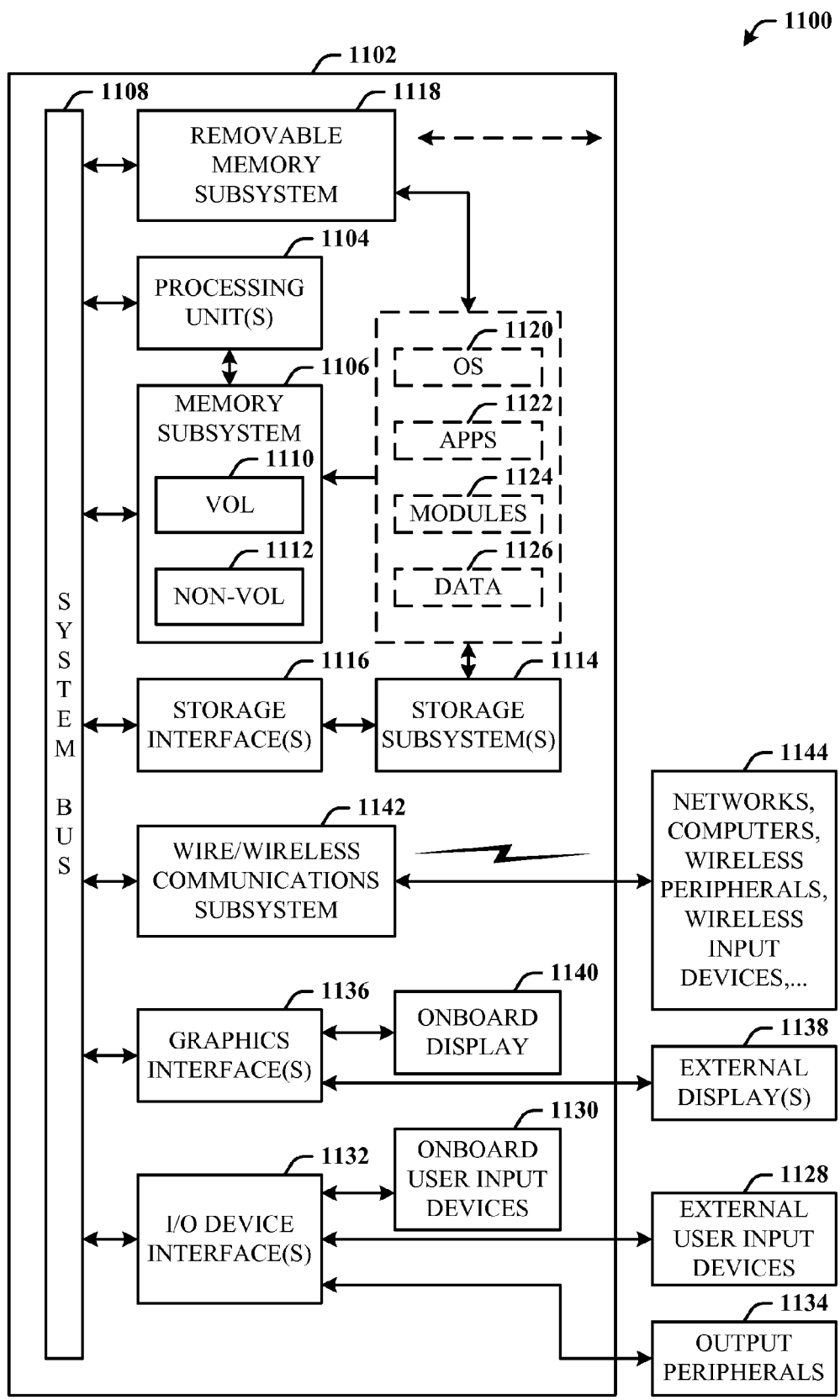
FIG. 11 illustrates a block diagram of a computing system that executes content processing for a single view in accordance with the disclosed architecture.

Referring now to FIG. 11, there is illustrated a block diagram of a computing system 1100 that executes content processing for a single view in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 11 and the following description are intended to provide a brief, general description of the suitable computing system 1100 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1100 for implementing various aspects includes the computer 1102 having processing unit(s) 1104, a computer-readable storage such as a system memory 1106, and a system bus 1108. The processing unit(s) 1104 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1106 can include computer-readable storage (physical storage media) such as a volatile (VOL) memory 1110 (e.g., random access memory (RAM)) and non-volatile memory (NON-VOL) 1112 (e.g., ROM, EPROM, EEPROM, etc.). A basic input/output system (BIOS) can be stored in the non-volatile memory 1112, and includes the basic routines that facilitate the communication of data and signals between components within the computer 1102, such as during startup. The volatile memory 1110 can also include a high-speed RAM such as static RAM for caching data.

The system bus 1108 provides an interface for system components including, but not limited to, the system memory 1106 to the processing unit(s) 1104. The system bus 1108 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1102 further includes machine readable storage subsystem(s) 1114 and storage interface(s) 1116 for interfacing the storage subsystem(s) 1114 to the system bus 1108 and other desired computer components. The storage subsystem(s) 1114 (physical storage media) can include one or more of a hard disk drive (HDD), a magnetic floppy disk drive (FDD), and/or optical disk storage drive (e.g., a CD-ROM drive DVD drive), for example. The storage interface(s) 1116 can include interface technologies such as EIDE, ATA, SATA, and IEEE 1394, for example.

One or more programs and data can be stored in the memory subsystem 1106, a machine readable and removable memory subsystem 1118 (e.g., flash drive form factor technology), and/or the storage subsystem(s) 1114 (e.g., optical, magnetic, solid state), including an operating system 1120, one or more application programs 1122, other program modules 1124, and program data 1126.

The an operating system 1120, one or more application programs 1122, other program modules 1124, and/or program data 1126 can include the entities and components of the system 100 of FIG. 1, the entities and components of the window 200 of FIG. 2, the content types and tiles illustrated with respect to FIGS. 3-8, and the methods represented by the flowcharts of FIGS. 9 and 10, for example.

Generally, programs include routines, methods, data structures, other software components, etc., that perform particular tasks or implement particular abstract data types. All or portions of the operating system 1120, applications 1122, modules 1124, and/or data 1126 can also be cached in memory such as the volatile memory 1110, for example. It is to be appreciated that the disclosed architecture can be implemented with various commercially available operating systems or combinations of operating systems (e.g., as virtual machines).

The storage subsystem(s) 1114 and memory subsystems (1106 and 1118) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 1102 and includes volatile and non-volatile internal and/or external media that is removable or non-removable. For the computer 1102, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 1102, programs, and data using external user input devices 1128 such as a keyboard and a mouse. Other external user input devices 1128 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1102, programs, and data using onboard user input devices 1130 such a touchpad, microphone, keyboard, etc., where the computer 1102 is a portable computer, for example. These and other input devices are connected to the processing unit(s) 1104 through input/output (I/O) device interface(s) 1132 via the system bus 1108, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 1132 also facilitate the use of output peripherals 1134 such as printers, audio devices, camera devices, and so on, such as a sound card and/or onboard audio processing capability.

One or more graphics interface(s) 1136 (also commonly referred to as a graphics processing unit (GPU)) provide graphics and video signals between the computer 1102 and external display(s) 1138 (e.g., LCD, plasma) and/or onboard displays 1140 (e.g., for portable computer). The graphics interface(s) 1136 can also be manufactured as part of the computer system board.

The computer 1102 can operate in a networked environment (e.g., IP-based) using logical connections via a wired/wireless communications subsystem 1142 to one or more networks and/or other computers. The other computers can include workstations, servers, routers, personal computers, microprocessor-based entertainment appliances, peer devices or other common network nodes, and typically include many or all of the elements described relative to the computer 1102. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1102 connects to the network via a wired/wireless communication subsystem 1142 (e.g., a network interface adapter, onboard transceiver subsystem, etc.) to communicate with wired/wireless networks, wired/wireless printers, wired/wireless input devices 1144, and so on. The computer 1102 can include a modem or other means for establishing communications over the network. In a networked environment, programs and data relative to the computer 1102 can be stored in the remote memory/storage device, as is associated with a distributed system. It will be appreciated that the network connections shown are exemplary and other means of establishing a communications link between the computers can be used.

The computer 1102 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented content system for aggregated view based on different content types, comprising:
   a content component configured to categorize contents of the different types received from a microblog feed into corresponding categories determined to be relevant or interesting to a user, wherein relevant content is connected to the user, user work, and user interests, and interesting content does not directly affect the user, yet which the user chooses to obtain;
   a presentation component configured to aggregate the contents of different types in a single highlights page that includes:
      a plurality of user-selectable tile clusters that present the relevant or interesting content based on different criteria of the user,
      each of the plurality of tile clusters comprising a plurality of content tiles where each of the plurality of content tiles represents a top content category,
      each content category has a correspondingly different visual representation based on content type,
      each content type is associated with a distinct behavior such that a user selection of a particular content tile opens an associated detailed access page based on the corresponding content type, and
      a particular selected cluster is in an expanded view and a non-selected cluster is in a reduced view; and
   a processor that executes computer-executable instructions stored in a memory.

2. The system of claim 1, wherein the selected content includes a post that is selected based on likes and activity related to the post.

3. The system of claim 1, wherein the selected content includes a link that is selected based on likes and activity related to an original post that included the link or actual clicks on the link.

4. The system of claim 1, wherein the selected content includes an image that is selected based on likes and activity related to an original post that included the image.

5. The system of claim 1, wherein the selected content includes recommended users to follow and highlighted users to follow.

6. The system of claim 1, wherein the selected content includes popular tags.

7. The system of claim 1, wherein the associated behavior enables drill-down to an additional detail of a selected content type.

8. A hardware computer storage medium having stored thereon instructions, when executed by a computer, implement a method of providing an aggregated view based on different content types, the method comprising:
   categorizing content of different types received from a microblog feed into corresponding categories determined to be relevant or interesting to a user, wherein relevant content is connected to the user, user work, and user interests, and interesting content does not directly affect the user, yet which the user chooses to obtain;
   aggregating the content of different types in a single highlights page that includes:
      a plurality of user-selectable tile clusters that present the relevant or interesting content based on different criteria of the user,
      each of the plurality of tile clusters comprising a plurality of content tiles where each of the plurality of content tiles represents a to content category,
      each content category has a correspondingly different visual representation based on content type, and
      each content type is associated with a distinct behavior such that a user selection of a particular content tile opens an associated detailed access page based on the corresponding content type.

9. The medium of claim 8, wherein the top content includes at least one of a post content type, a link content type that is selected based on likes and activity related to an original post that included the link, or an image content type that is selected based on likes and activity related to an original post that included the image.

10. The medium of claim 8, wherein the top content includes recommended users to follow and popular hash tags.

11. The medium of claim 8, wherein the top content being attributed as most liked, most popular, most active, and to follow.

12. A computer-implemented content method utilizing at least one computer for providing an aggregated view based on different content types, comprising acts of:
   categorizing content of different types received from a microblog feed into corresponding categories determined to be relevant or interesting to a user, wherein relevant content is connected to the user, user work, and user interests, and interesting content does not directly affect the user, yet which the user chooses to obtain;
   aggregating the content of different types in a single highlights page that includes:
      a plurality of user-selectable tile clusters that present the relevant or interesting content based on different criteria of the user,
      each of the plurality of tile clusters comprising a plurality of content tiles where each of the plurality of content tiles represents a to content category, each content category has a correspondingly different visual representation based on content type, and each content type is associated with a distinct behavior such that a user selection of a particular content tile opens an associated detailed access page based on the corresponding content type.

13. The method of claim 12, further comprising exposing additional details of a particular content tile based on interaction with the particular content tile.

14. The method of claim 12, further comprising selecting and presenting the top content that is at least one of a post content type or a link content type.

15. The method of claim 12, further comprising selecting and presenting the top content that is at least one of an image content type or a tag content type.

16. The method of claim 12, further comprising selecting and presenting the top content that at least one of presents top users or follows recommended people.

17. The method of claim 12, further comprising selecting and presenting the top content based on at least one of number of followers, activity level, or most liked.

18. The method of claim 12, further comprising presenting the top content based on a selected time criterion.

* * * * *